US012054184B1

(12) United States Patent
Lamoncha

(10) Patent No.: US 12,054,184 B1
(45) Date of Patent: Aug. 6, 2024

(54) SAFETY SYSTEMS FOR RAILROAD TRAINS AND CARS, METHODS FOR OPERATING OF THE SAME

(71) Applicant: Mark Lamoncha, Columbiana, OH (US)

(72) Inventor: Mark Lamoncha, Columbiana, OH (US)

( * ) Notice: Subject to any disclaimer, the term of this patent is extended or adjusted under 35 U.S.C. 154(b) by 0 days.

(21) Appl. No.: 18/126,132

(22) Filed: Mar. 24, 2023

Related U.S. Application Data

(60) Provisional application No. 63/451,782, filed on Mar. 13, 2023.

(51) Int. Cl.

| | |
|---|---|
| ***B61L 15/00*** | (2006.01) |
| ***B61G 7/14*** | (2006.01) |
| ***B61L 23/00*** | (2006.01) |
| ***B61L 25/02*** | (2006.01) |
| ***B61L 27/00*** | (2022.01) |
| *G08C 17/02* | (2006.01) |

(52) U.S. Cl.

CPC ............ *B61L 15/0058* (2024.01); *B61G 7/14* (2013.01); *B61L 15/0072* (2013.01); *B61L 23/00* (2013.01); *B61L 25/02* (2013.01); *B61L 27/00* (2013.01); *B61L 2205/00* (2013.01); *G08C 17/02* (2013.01)

(58) Field of Classification Search

CPC ... B61G 7/14; B61L 15/0058; B61L 15/0072; B61L 23/00; B61L 25/02; B61L 27/00; B61L 2205/00; G08C 17/02

See application file for complete search history.

(56) References Cited

U.S. PATENT DOCUMENTS

| | | | |
|---|---|---|---|
| 9,151,681 B2 | 10/2015 | Arndt et al. | |
| 9,365,223 B2 | 6/2016 | Martin et al. | |
| 9,561,811 B2 | 2/2017 | Traylor et al. | |
| 10,137,915 B2 | 11/2018 | LeFebvre et al. | |
| 10,549,763 B2 * | 2/2020 | Brooks | B61L 23/06 |
| 10,906,571 B2 | 2/2021 | Mian | |
| 11,214,288 B2 | 1/2022 | Ghaly | |
| 11,349,589 B2 | 5/2022 | Carlson et al. | |
| 2019/0176862 A1 | 6/2019 | Kumar et al. | |
| 2019/0300033 A1 | 10/2019 | Carlson et al. | |

(Continued)

OTHER PUBLICATIONS

Wikipedia, Defect Detector, webpage, date accessed Mar. 2, 2023, 7 pages.

(Continued)

*Primary Examiner* — Hung Q Nguyen
*Assistant Examiner* — Mark L. Greene
(74) *Attorney, Agent, or Firm* — Standley Law Group LLP; Jeffrey S. Standley; Adam J. Smith

(57) ABSTRACT

A safety system and related methods for a train are provided. Sensors are located at axles and bearing of freight cars. Where a control system determines that data received from sensors located at axles and bearings of freight cars exceed safety parameters, safety devices for the train are activated which slow or stop the train, an alert is transmitted to at least two remote devices, one associated with a railroad operator authority and one associated with a local governmental authority, and deactivation of the safety devices is electronically prevented unless and until authenticated override authorizations are received from both remote devices.

20 Claims, 7 Drawing Sheets

(56) References Cited

U.S. PATENT DOCUMENTS

2021/0253150 A1 9/2021 Ghaly
2021/0403062 A1* 12/2021 Bramucci ............. B61L 23/041

OTHER PUBLICATIONS

Elbein, Saul, Four systemic safety issues the East Palestine crash report may point to, web article, date accessed Mar. 2, 2023, 17 pages.

* cited by examiner

SAFETY SYSTEMS FOR RAILROAD TRAINS AND CARS, METHODS FOR OPERATING OF THE SAME

CROSS-REFERENCE TO RELATED APPLICATIONS

This application claims the benefit of U.S. Provisional Application Ser. No. 63/451,782 filed Mar. 13, 2023, the disclosures of which are hereby incorporated by reference as if fully restated herein.

TECHNICAL FIELD

Exemplary embodiments relate generally to safety systems for railroad cars and trains, such as which utilize automatically activated safety devices and multi-party override requirement features, as well as methods for operating the same.

BACKGROUND AND SUMMARY OF THE INVENTION

The railroad derailment in East Palestine, Ohio on or about Feb. 3, 2023 is but one of many railroad derailments, crashes, or other safety incidents in the United States. The US Federal Railroad Administration reports an average of 1,475 train derailments per year between 2005-2021 (https://www.bts.gov/content/train-fatalities-injuries-and-accidents-type-accidenta). However, all forms of transportation have imperfect safety records, and railroad transportation provides several advantages including a relatively high level of energy efficiency when transporting relatively large or heavy goods and relatively high capability for transporting such relatively large or heavy goods compared to many other forms of transportation. Furthermore, despite an imperfect safety record, railway transportation is, in many ways, a safer mode of transport for relatively hazardous cargo, especially in large quantities. Thus, maximizing the safe travel of trains, which commonly transport relatively large and hazardous loads, is of particular importance. Therefore, what is needed are safety systems for railroad cars and trains.

Safety systems and methods for railroad cars and trains are provided. Conventionally, railway safety features typically utilize a number of rail-based sensors and systems, or other fixed sensors or manned outposts located adjacent railways. However, it is expensive to outfit or retrofit rails with these systems. Therefore, one particular advantage of the present disclosure includes providing a train-based system which does not rely on modifying underlying railways themselves. Further, these systems only provide periodic glimpses into the state of a train or railcar. Therefore, one particular advantage of the present disclosure includes providing near real-time monitoring of train or rail car status.

Additionally, conventional approaches provide reporting to a train operator or railroad company. However, train operators or railroad companies may not be aware of all the local potential impacts from derailment or continued transit, particularly of hazardous, large, or heavy cargo, and the benefits of collaboration with local authorities to execute duties properly. Therefore, one particular advantage of the present disclosures includes providing a multi-party override requirement, at least one party of which may be an outside authority, such as a local government official, which may facilitate local authority input and collaboration to enhance safety and efficacy.

Further still, conventional approaches may require intervention or judgment by a train operator or railroad company. However, train operators or railroad companies may be naturally incentivized to continue transit uninterrupted, may be unable to execute duties properly, or may exercise improper judgment. Therefore, one particular advantage of the present disclosures includes providing automated activation of safety devices, and may include a normally activated approach which is triggered unless a safety authorization signal is consistently received.

Rail cars may be outfitted with a number of sensors. The sensors may include temperature sensors and/or frequency sensors, though other types and kinds of sensors may be utilized. The sensors may be placed at axles and/or wheel bearings, though other locations may be utilized. The sensors may report data to a controller, preferably located at the lead locomotive engine, though any location may be utilized. For example, each rail car may have its own set of sensors which report to a dedicated control unit. In this fashion, the rail cars may operate independently, or the dedicated control units may all report to a main control unit. Communication may be established by wired and/or wireless connection. Regardless, sensor data may be monitored and where any established safety parameter is reached, one or more safety devices may be activated. Other information may be reported, including cargo information. The safety devices may include, but are not limited to, speed reduction routines, engine shut down and/or lockout routines, wheel brakes, control lockouts, combinations thereof, or the like.

Proximate and/or advance jurisdictional authorities may be automatically notified of the safety feature activation and/or safety parameters exceeded, such as by way of the controller. For example, the train's location may be determined by the controller and notifications may be provided to one or more proximate authorities based on the jurisdictional district(s) the train is currently located in and/or moving towards. The controller may be configured to prevent deactivation of the safety devices and/or prevent at least certain of user input from operator interfaces of the train from normal or full processing unless and until a multi-party override is received. The multi-party override may be required from both a previously registered representative of the railroad owner or operator and a previously registered representative of the proximate governmental authority, by way of non-limiting example. The override may be provided in the form of an authenticated signal, encrypted key, password, presentation of an authentication device, combinations thereof, or the like.

The controller may be configured to operate a safety subroutine whereby normal operations of the locomotive are only permitted so long as a safety signal is consistently received from one or more remote devices, such as associated with the railroad owner or operator and/or the proximate governmental authority. The safety signal may be provided in the form of an authenticated signal, encrypted key, password, presentation of an authentication device, combinations thereof, or the like. Where the safety signal is not received, the safety devices may be automatically activated, requiring the multi-party override for deactivation and resumption of normal operations.

In certain exemplary embodiments, each car may be independently monitored, operated, and/or powered such as by a localized controller and/or power supply (e.g., solar, wind, and/or battery). This may permit safety devices to be activated for individual cars, which may slow an entire train. Coupling devices may be operated automatically, such as one of the safety devices. This may, by way of non-limiting example, allow individual, potentially problematic cars to be decoupled and moved to a siding, for example, while the train is permitted to travel on, for example without limitation.

The system may include a transponder. The transponder may be configured to determine and/or report data regarding location of the car and/or its cargo. Each of the cars may include an independent transponder by way of non-limiting example. Transponder information may be automatically passed to the remote devices when the respective car is within a predetermined proximity thereof and/or a respective jurisdictional district. Alternatively, or additionally, the transponders may be activated when one or more of the parameters are met or exceeded such that the transponders are another safety device.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
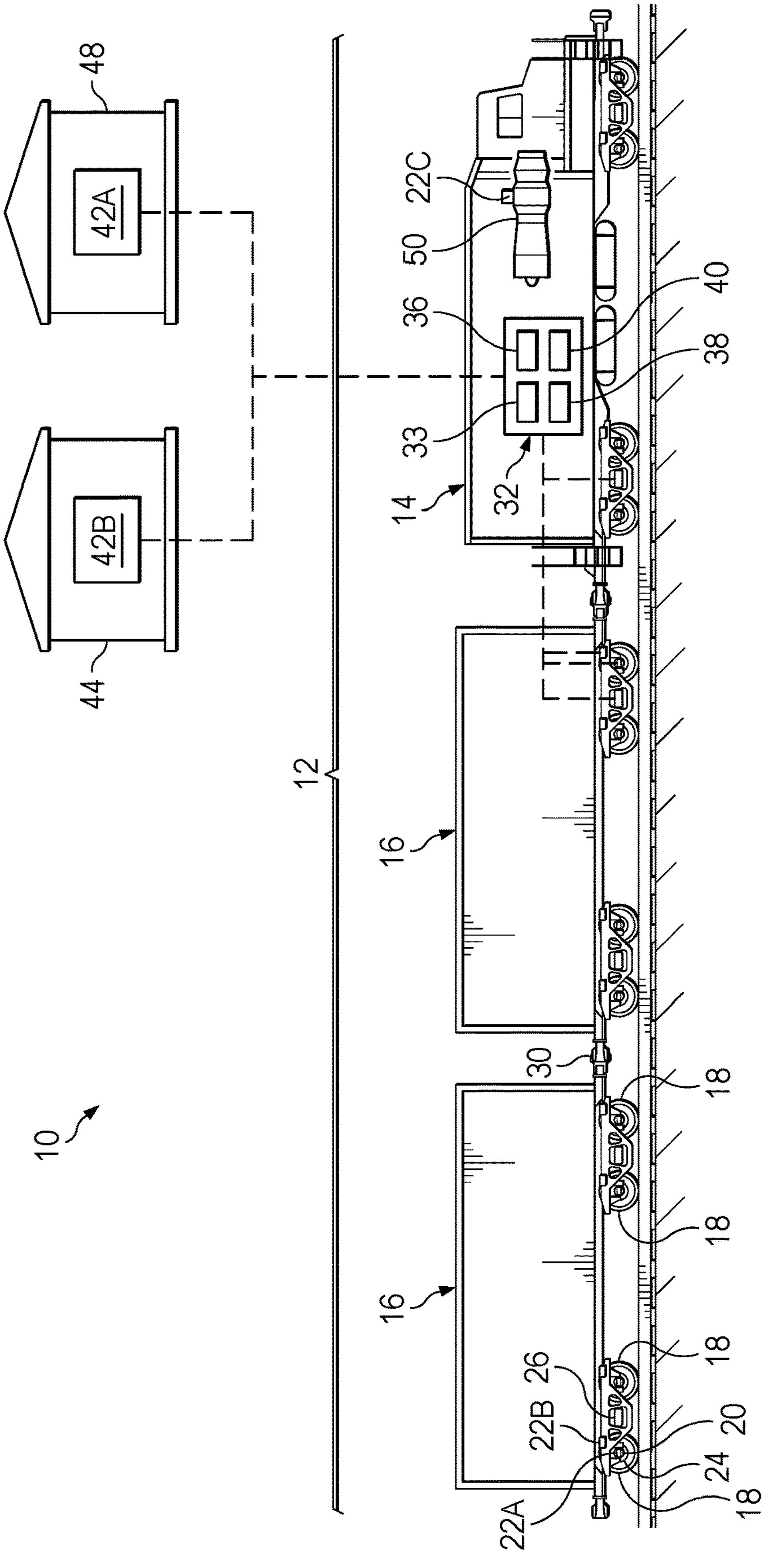
FIG. 1 is a simplified diagram for an exemplary railroad safety system in accordance with the present invention.
Figure 3:
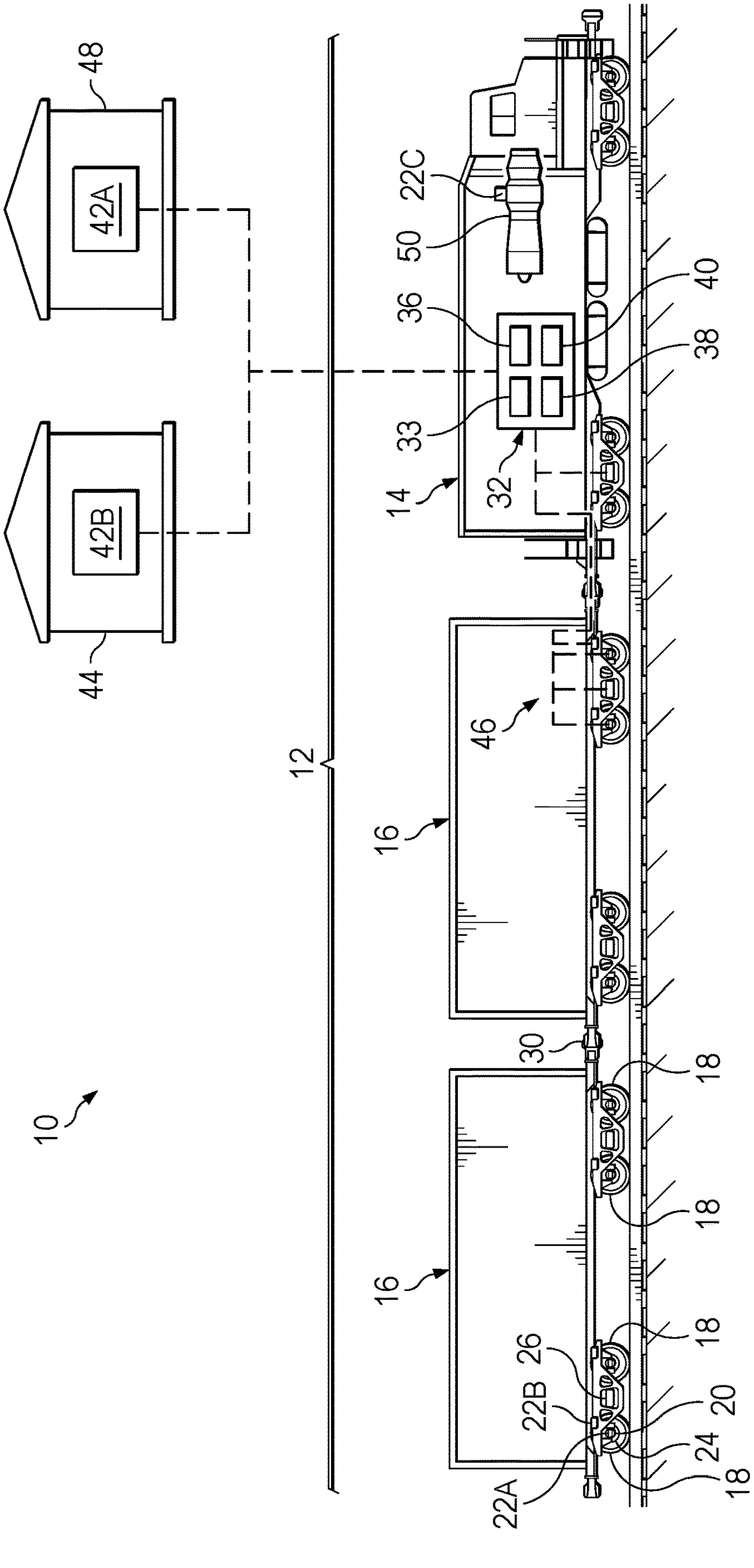
FIG. 3 is a simplified diagram for another exemplary embodiment of the railroad safety system of FIG. 1.

FIG. 1 though FIG. 3 illustrate various embodiments of a railroad safety system 10 in accordance with the present invention. The system 10 may be configured to work with any type of kind of train 12. The train 12 may comprise any number, type, and/or kind of cars 16, such as for cargo (e.g., box cars, flat cars, tank cars, cattle cars, hoppers, gondolas, or the like), passengers (e.g., sleeping compartment, seating compartments, dining cars, entertainment cars, sightseeing cars, or the like), combinations thereof, or the like. The train 12 may comprise any number, type, and/or kind of locomotives 14. The locomotive(s) 14 may comprise one or more propulsion systems 50. The locomotive(s) 14 may be diesel powered, electrically powered, gas turbine powered, battery powered, combinations thereof, or the like and may comprise one or more related propulsion systems 50 and/or components.

Some or all cars 16 and/or locomotives 14 of the train 12 may be outfitted with sensors 22. In exemplary embodiments, the sensors 22 are located at or near the wheels 18, though the sensors 22 may be located anywhere. The sensors 22 may include temperature and/or frequency sensors, though any type and/or kind of sensor 22 may be utilized. In exemplary embodiments, without limitation, at least one sensor 22A is positioned at or adjacent an axle 20 of a wheel 18, and at least one other sensor 22B is positioned at or adjacent to a wheel bearing assembly 24 of the wheel 18 for each wheel 18 or each car 16 and/or locomotive 14 of the train 12. However, any number of sensors 22 of any type or kind may be used at any location(s) for some or all wheels 18 of some or all cars 16 and/or locomotives 14 of the train 12. Alternatively, or additionally, at least one sensor 22C may be positioned at or adjacent to the propulsion system 50 of each locomotive 14.

Each of the wheels 18 may comprise or be associated with a braking subsystem 26. The braking subsystem 26 may be configured to automatically apply braking forces to the wheels 18 such as by way of one or more motors, levers, hydraulics, springs, combinations thereof, or the like. Some or all wheels 18 of some or all cars 16 and/or locomotives 14 of the train 12 may include their own, or a shared, braking subsystem 26. The braking subsystems 26 may be configured to normally provide braking forces or normally provide otherwise free movement of the wheels 18.

In exemplary embodiments, without limitation, the braking subsystem 26 may comprise a pneumatic system which is configured for normal activation to apply braking force to the wheels 18 when one or more pneumatic lines otherwise applying force to maintain the braking elements off the wheels 18 are cut, uncoupled, or the like. The braking subsystem 26 may comprise a cutting or pulling device, such as but not limited to one or more spring biased cutting edges, configured to automatically cut the pneumatic lines when an electronic command is received thereby causing the braking elements to contact, and apply for to, the wheels 18. As another example, without limitation, the braking subsystem 26 may comprise electromagnetic elements configured to be normally demagnetized, and when activated, pull or hold the braking elements away from the wheels 18. The braking subsystem 26 may be configured to demagnetize the electromagnetic elements upon command, thus causing the braking elements to contact, and apply for to, the wheels 18. These are merely exemplary and not intended to be limiting. Other type and kinds of automated braking systems may be utilized. Regardless, upon command (or lack of receipt of a command to the contrary) some or all of the braking subsystems 26 may be configured to apply braking forces at the wheels 18 for individual cars 16 and/or locomotives 14 and/or the entire train. In this fashion, the individual cars 16 may be slowed and/or stopped, such as to control the cars 16 individually and/or slow or stop some or all of the train 12. Alternatively, the entire train 12 may be braked, such as to maximize rate of slow.

The sensors 22 may be in electronic communication with a controller 32. The controller 32 may be located at a lead one of the locomotives 14, though the controller 32 may be located at any car 16 and/or locomotive 14 of the train 12, or remote from the train 12. The sensors 22 may be configured for wireless or wired communication with the controller 32.

As illustrated with particular regard to FIG. 1, for example without limitation, each of the sensor 22 may wirelessly communicate data to the controller 32. The controller 32 may also be in wireless communication with the braking subsystems 26, such as to transmit braking commands and/or receive data regarding braking status. The controller 32 may also be wireless communication with the propulsion systems 50, such as to transmit shut down, power reduction, or speed reduction commands, routines, and/or the like. Alternatively, or additionally, the controller 32 may be configured to receive data regarding propulsion system 50 status from the propulsion system 50 and/or the sensors 22C. Such wireless communication may be accomplished by a wireless transmitter/receiver 33 located at the controller 32. The wireless communication may operate using a local area network, ad hoc network, mesh network, near field communication protocols, internet protocols, cellular networks, the world wide web, an internet, an intranet, combinations thereof, or the like.

Figure 2:
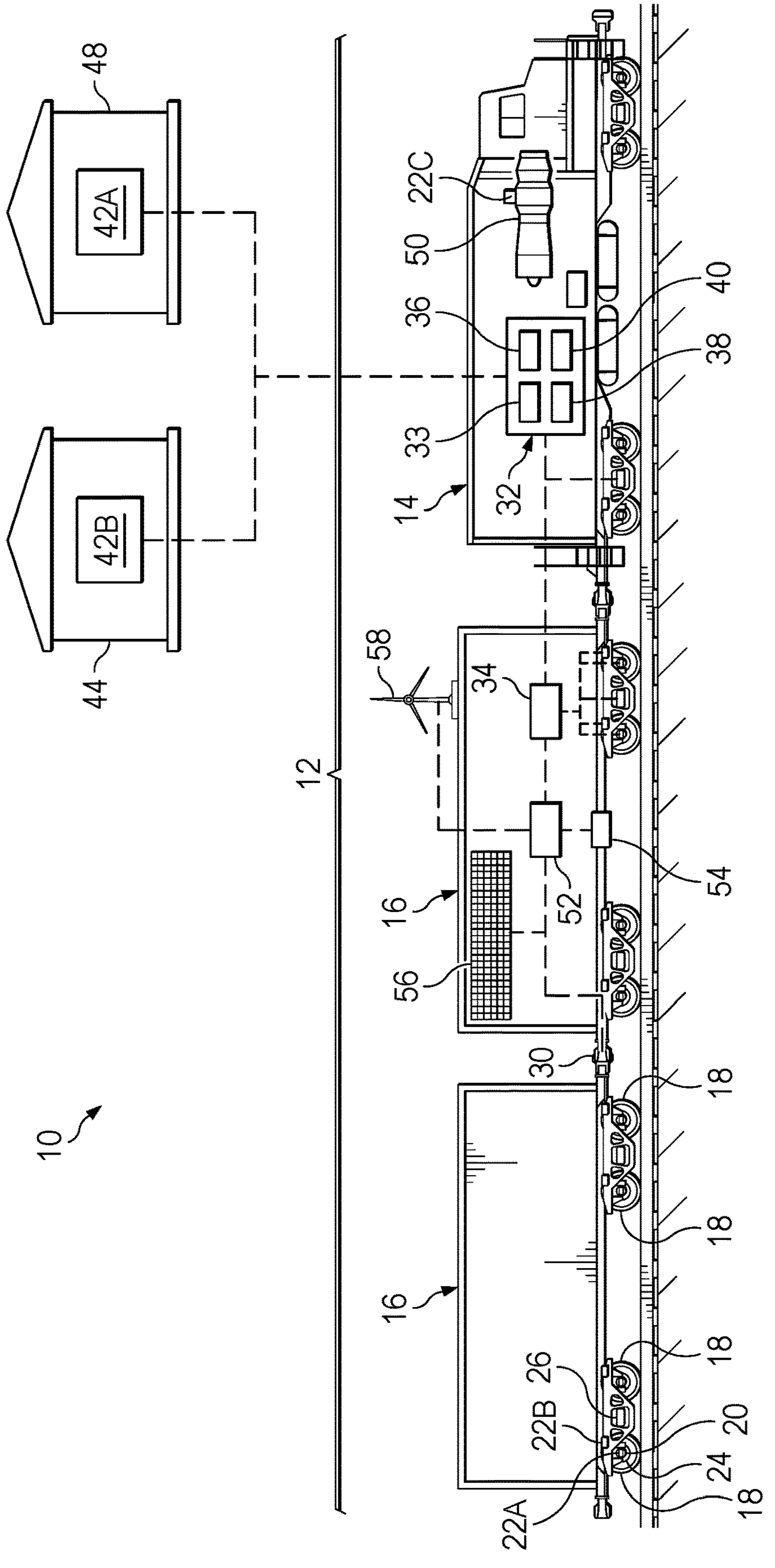
FIG. 2 is a simplified diagram for another exemplary embodiment of the railroad safety system of FIG. 1.

As illustrated with particular regard to FIG. 2, as another non-limiting example, some or all cars 16 of a train 12 may contain a dedicated control subsystem 34 to which each or the sensors 22 and/or braking subsystems 26 are in wired and/or wireless communication. Each of the control subsystems 34 may be in wired or wireless communication with the controller 32. In embodiments where one or more dedicated control subsystems 34 are utilized, the controller 32, which may be located at the lead one of the locomotives 14 by way of non-limiting example, may sometimes be referred to herein as a master control unit.

As illustrated with particular regard to FIG. 3, as another non-limiting example, wiring 46 may extend between some or all of the cars 16 and/or locomotives 14 to provide a wired connection. In exemplary embodiments, without limitation, such wiring 46 may extend along, within, or adjacent the coupling devices 30 between the cars 16 and/or locomotives 14 of a train 12.

The wireless options shown and/or described herein may allow greater flexibility in operating the system 10 with various size and/or type trains 12, allowing rapid reconfiguration and re-networking to control a given train 12, such as when cars 16 and/or locomotives 14 are swapped out. The controller 32 may be configured to automatically detect and/or connect with proximate sensors 22 and/or braking subsystem 26 to form a network. Data transmission may be encrypted.

The wired and/or relatively short-range wireless options shown and/or described herein may allow greater data security in operating the system 10 such as by providing closed transmission of information. The controller 32 may be configured to automatically detect and/or connect with sensors 22 and/or braking subsystem 26 in wired connection therewith.

The use of dedicated control subsystems 34 may provide for single point access to all sensors 22 and/or braking subsystems 26 of a given car 16 and/or locomotive 14 to allow ease of communication and network formation, such as upon coupling or decoupling of the cars 16 and/or locomotives 14. In this fashion, a network may be created by joining more cars 16 and/or locomotives 14 together to form a train 12.

Each coupling 30 of the train 12 may comprise one or more wireless (e.g., near field communication) devices 62, such as but not limited to those utilizing Bluetooth® technologies, radio frequency identification (RFID) technology, combinations thereof, or the like, though longer-range wireless devices may be utilized. Such devices may be configured to automatically pair upon when co-located within a distance approximating a coupled car 16 or locomotive 14 for the train 12, by way of non-limiting example. Alternatively, or additionally, each of the couplings 30 may comprise electrically conductive surfaces 64, such as at or near mating portions thereof, which contact or are placed in sufficient proximity upon coupling. Alternatively, or additionally, electrical and/or electronic connection lines 66, such as which may include plugs and/or outlets, may be provided at each coupling 30 for the cars 16 and/or locomotives 14 of the train 12 which may be aligned and otherwise configured for automatic connection when coupled, and/or positioned and configured for manual connection before or after coupling. These may provide for manual or automatically connection through wired or wireless means between the various components of the system 10 for a given train 12.

Figure 7:
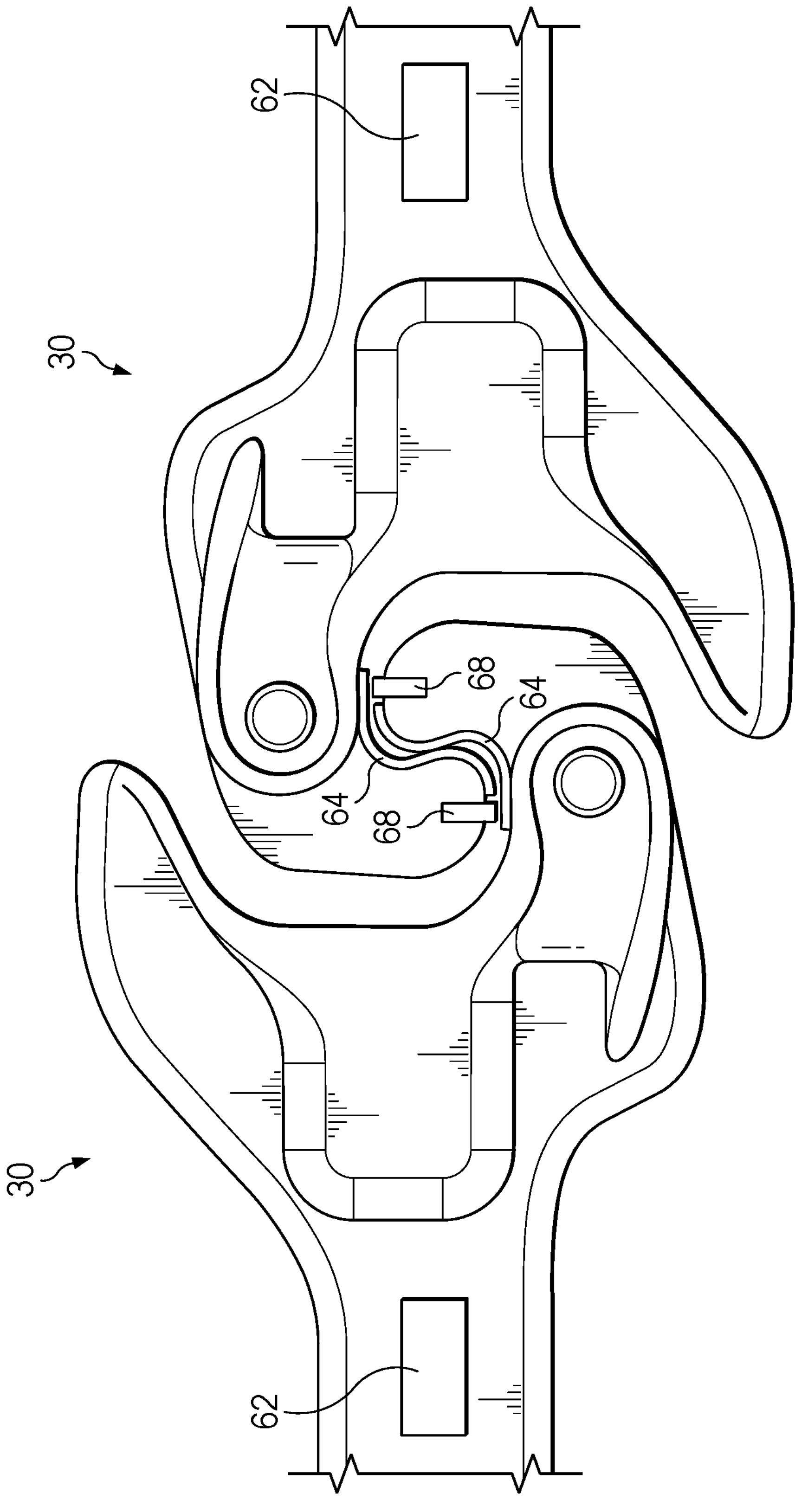
FIG. 7 is a top plan view of an exemplary coupling for the systems of FIGS. 1-3.

As illustrated with particular regard to at least FIG. 7, the couplings 30 may comprise one or more automatic decoupling devices 68, such as motors, actuators, pistons, explosives, pneumatics, combinations thereof, or the like. These components may be configured to automatically move the couplings 30 out of a mating relationship, such as by forcing at least one of the couplings 30 open, or the like. The decoupling devices 68 may be configured to provide automatic decoupling, in exemplary embodiments without limitation. The couplings 30 may be in electronic communication with the controller 32 and/or control subsystem 34, which may be configured to automatically command decoupling of one or more cars 16 when any of the parameters are met or exceeded. In this fashion, the couplings 30 may serve as a safety device. In this way, potentially problematic cars 16 may be automatically decoupled, such as to prevent a larger scale derailment and/or facilitate movement onto a siding so that the train 12 may continue. The couplings 30 and/or decoupling devices 68 may be electrically powered by the power supply 52 in exemplary embodiments, without limitation, such as to permit each car 16 to be independently operated and powered in this regard, such as after decoupling, though such is not necessarily required. While certain features may be shown and/or described with particular regard to FIG. 2, these features may be utilized with any embodiment shown and/or described, such as with regard to FIGS. 1 and 3 by way of non-limiting example.

The wireless transmitter/receiver 33 may be in wireless electronic communication with one or more remote devices 42. In exemplary embodiments, without limitation, a first set of one or more of the remote devices 42A may be each associated with a respective, directly interested party 48. The directly interested parties 48 may include, for example without limitation, the railroad, train 12, locomotive 14, and/or car 16 owner(s), renter(s), lessor(s), and/or operator (s). A second set of one or more of the remote devices 42B may be each associated with a respective independent third-parties 44. The independent third-parties 44 may include, for example without limitation, various governmental authorities (e.g., law enforcement, regulatory, agencies, combinations thereof, or the like), such as at a local level, though any level governmental (e.g., state, federal, etc.) and/or other independent third party may be utilized (e.g., union, trade association, manufacturer, testing laboratory, non-governmental regulatory body, combinations thereof, or the like). Any number of remote devices 42 associated with any number of parties, directly interested or otherwise, may be part of the system 10.

The remote devices 42 may comprise servers, computers, tablets, smartphones, dedicated computer appliances, combinations thereof, or the like. However, the remote devices 42 may be associated with any party, and the controller 32 may be in communication with any number or type of remote devices 42. The controller 32 and/or dedicated control subsystem 34 may comprise servers, computers, tablets, smartphones, dedicated computer appliances, combinations thereof, or the like. In exemplary embodiments, at least the remote devices 42 and the controller 32 comprise dedicated appliances configured to operate on a closed network, such as to reduce or prevent tampering with safety parameters, train 12 operations, and/or other aspects of the system 10. The closed appliances may utilize a dedicated format for signaling, such as which uses various encryption, authentication, decryption, transmission, and other standards and protocols. The remote devices 42 may be physically housed in buildings associated with the local jurisdictional authorities 44, 48 and kept under various security protocols (e.g., electronic and/or physical), though such is not necessarily required.

The controller 32 may comprise, or be in electronic communication with, one or more databases 36. The database(s) 36 may comprise and/or be configured to receive, transmit, and/or store safety parameters, data readings from the sensors 22, authentication information for authorized parties, safety protocol routines, command logs, operating routines, combinations thereof, or the like.

The controller 32 may comprise, or be in electronic communication with, one or more location tracking devices 40. The location tracking devices 40 may comprise GPS devices, cellular triangulation devices, combinations thereof, or the like.

The controller 32 may comprise one or more electronic storage devices, which may include the databases 36 and/or software instructions, and/or processors 38, such as for carrying out the software instructions. The software instructions may be configured to provide some or all of the features and/or functionalities shown and/or described herein.

The remote devices 42 may comprise one or more authentication subsystems or modules for accepting and/or verifying authentication information. Such more authentication subsystems or modules may comprise user interfaces, keyboards, keypads, biometric reading devices (e.g., fingerprint/handprint readers, fingerprint/handprint recognition software, voice recognition software, microphones, cameras, facial recognition software, pupil recognition software, combinations thereof, or the like), keycard readers, near field communication devices, ports (e.g., USB), authentication devices (e.g., keycard, USB device, hardware key, combinations thereof, or the like), combinations thereof, or the like. The authentication information may include, for example without limitation, user names, passwords, credentials, electronic keys, encrypted codes, biometric information, combinations thereof, or the like. The provided information may be verified locally at the remote devices 42 and/or remotely at the controller 32, such as but limited to by comparing the provided information against information stored at the database(s) 36.

The figures provided herewith do not necessarily provide call outs for each of the wheels 18, the sensors 22, axles 20, bearing subassemblies 24, braking subsystems 26, couplings 30, control subsystems 34, wiring 46, combinations thereof, or the like. However, where similar items are shown and/or described, those of ordinary skill in the art will recognize that the same or similar components may be provided.

The wheels 18 shown and/or described herein may be configured to contact the rails of the railroad track and may sometimes be referred to herein as railway track wheels.

The system 10 may include one or more transponders 54, such as shown with particular regard to FIG. 2. The transponders 54 may be configured to determine and/or report data regarding location of a respective one of the cars 16 to which it is attached or associated and/or information regarding cargo carried by the respective car 16. Some or all of the cars 16 may include an independent transponder 54 by way of non-limiting example. The transponders 54 may be continually operated, such as by transmitting information on a periodic basis, and/or selectively operated, such as only if/when any one or the safety parameters is met or exceeded. The transponders 54 may be operated independently, by the controller 32, and/or a respective one of the control subsystems 34 for the respective car 16.

In exemplary embodiments, without limitation, information from the transponders 54 may be automatically passed to one or more of the remote devices 42. For example, without limitation, information may be automatically transmitted to a respective one or ones of the remote devices 42 associated with a respective one or ones of the jurisdictional districts 60 the respective car 16 is within and/or within a predetermined proximity of. Alternatively, or additionally, the transponders 54 may be automatically activated, such as by the control system 32 and/or dedicated control subsystem 34, when one or more of the parameters are met or exceeded such that the transponders 54 are another safety device of the system 10. For example, without limitation, the transponder 54 may include, or be in electronic communication with, a location tracking device for determining when the car 16 is within a particular jurisdictional district 60. Geographic parameters for the districts 60 may be stored at the database (s) 36 for example without limitation. The cargo information may be pre-programmed into the transponder 54 or connected controller 32, 34 or other device, by way of non-limiting example.

The transponders 54 may be configured to transmit data to the controller 32, the control subsystems 34 (and then on to the controller 32, or to the remote devices 42 without the controller 32 interposed), and/or to the remote devices 42 without the controller 32 and/or control subsystems 34 interposed by way of non-limiting examples. Where the controller 32 is interposed, it may gather information from all the transponders 54 and/or control subsystem 34 for batch transmission to the remote devices 42, by way of non-limiting example. In this fashion, local jurisdictional authorities may receive information on trains 12, cars 16, engines 14, or the like passing through their respective districts 60.

As shown with particular regard to FIG. 2, each of the cars 16 may be independently monitored and/or operated, such as by way of a dedicated control subsystem 34. In certain exemplary embodiments, without limitation, each of the cars 16 may be independently operated, controlled, and/or powered. For example, without limitation, the dedicated control subsystems 34 may be operated independently of the controller 32 and may interface with the remote devices 42 without the controller 32 interposed. Alternatively, or additionally, the dedicated control subsystems 34 may independently monitor respective sensors 22 and/or exercise operational command of respective safety devices, such as without the controller 32 interposed.

Each car 16 may comprise an independent power supply 52. The power supply 52 may comprise, or be connected to, one or more batteries, generators, solar panels 56, wind turbines 58, combinations thereof, or the like. The power supply 52 may be configured to electrically power the dedicated control subsystem 34, the braking system 54, the sensors 22, the transponders 54, combinations thereof, of the like in an independent fashion, though such is not necessarily required.

Some or all of the aforementioned features may permit safety devices to be activated for individual cars 16, which may slow an entire train 12. This may, alternatively or additionally, allow individual, potentially problematic cars 16 to be decoupled and moved to a siding, for example, while the train 12 is permitted to travel on, for example without limitation. While the system 10 and/or components thereof may be applied to an entire train 12, the system 10 and/or components thereof may be applied to individual cars 16 and/or engines 14. In this fashion, the system 10 and/or components thereof may be applied to cars 16 carrying, or configured or designated to carry, hazardous, large, and/or heavy cargo by way of non-limiting example and be permitted to operate independently on such cars 16.

While certain features may be shown and/or described with particular regard to FIG. 2, these features may be utilized with any embodiment shown and/or described, such as with regard to FIGS. 1 and 3 by way of non-limiting example.

Figure 4:
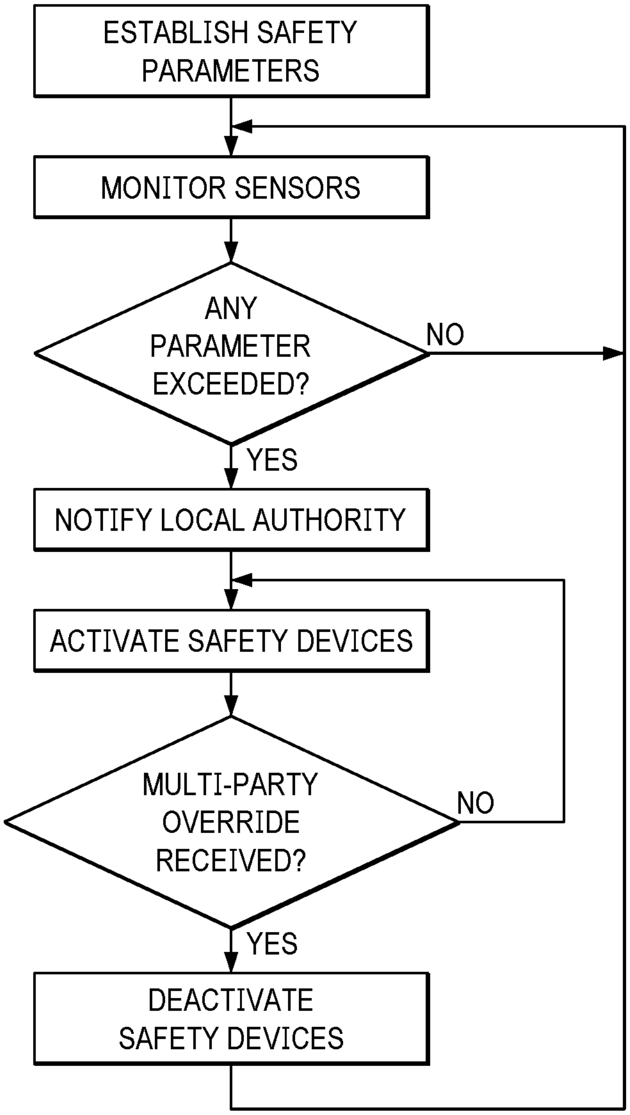
FIG. 4 is a flow chart with exemplary logic for operating the system of FIGS. 1-3 in accordance with the present invention.

FIG. 4 illustrates an exemplary method for operating the system 10. Safety parameters may be established. These parameters may include acceptable temperature and/or frequency readings from the sensors 22, though any type or kind of parameter may be utilized. The parameters may, by way of non-limiting example, reflect temperatures at which the axles 20 and/or bearings of the bearing subassemblies 24 may change state or otherwise experience failure or danger of failure. Alternatively, or additionally, the parameters may reflect frequencies associated with abnormal operations, failure events, and/or danger of failure events of the axles 20 and/or the bearing subassemblies 24. Alternatively, or additionally, the parameters may reflect temperatures and/or frequencies associated with abnormal operations, failure events, and/or danger of failure events of the propulsion systems 50. Any type or kind of parameters may be utilized. The parameters may be thresholds, ranges, combinations thereof, or the like. The parameters may include safety margins, such as from an anticipated failure or problem point. The safety margins may be any amount or percentage, such as but not limited to 30%. Any type or size margin may be utilized. The parameters may be set in accordance with various regulations promulgated by independent laboratories, governmental authorities and/or regulators, railroad owners and/or operators, trade associations, unions, combinations thereof, or the like. The safety parameters may be stored at the database(s) 36.

Data from the sensors 22 may be received and compared against the stored parameters, such as at the controller 32. The data may be received on a real-time, or substantially real-time basis. Substantially real-time may include accounting for normal and customary delays in transmission, processing, and the like.

Where any one or more parameters are exceeded, such as on a discrete basis, a predetermined number of times within a given time period, or the like, the controller 32 may be configured to automatically activate one or more safety devices. The safety devices may include, for example without limitation, propulsion system 50 reduction routines, propulsion system 50 shut down routines, braking commands for the braking subsystems 26, speed reduction routines for the braking subsystems 26 and/or propulsion system 50, command system and/or user input disablements for operator interfaces of the locomotives 14 and/or certain input therefrom (e.g., resuming or increasing propulsion, deactivating safety devices, combinations thereof, or the like), combinations thereof or the like. These routines and/or commands may be configured to cause operations to be performed at the braking subsystems 26, the propulsion systems 50, the transponders 54, the couplings 30, and/or operator interfaces, such as activating or increasing braking forces provided, decreasing or shutting off propulsion, activating the transponders 54, decoupling cars 16, deactivating operator interfaces (or certain features or commands thereof), combinations therefor, or the like.

The command system and/or user input disablements may include, but are not necessarily limited to, software commands blocking at least certain user input (e.g., resuming or increasing propulsion, deactivating safety devices, combinations thereof, or the like) from being received at and/or fully and/or normally processed, and/or activation of hardware disablements, such as electronic and/or physical switch decoupling, motorized, actuator, and/or spring driven shields that physically block access to or movement of at least certain of the operator interfaces controls of the locomotives 14, combinations thereof, or the like. The command system and/or user input disablements may sometimes be referred to herein as lockouts. The lockouts may be automatically activated by the control system 32 and/or dedicated control subsystems 34 when one or more safety parameters are met or exceeded. The lockouts may serve as one of the safety devices.

In exemplary embodiments, without limitation, the system 10, such as by way of one or more routines programmed at the control system 32 and/or dedicated control subsystems 34, may be configured to first attempt to slow the train 12 by way of the propulsion systems 50 slowing and/or ceasing propulsion, such as in conjunction with operator interface lockouts. If slowdown is not achieved, or not achieved in a desired fashion (e.g., at or exceeding a predetermined rate, speed threshold, or the like), the system 10 may be configured to activate other safety devices, including the braking subsystems 26 and/or coupling devices 30.

Where any safety parameter is met or exceeded and/or any safety devices are activated, such as in accordance with the foregoing, the controller 32 may be configured to automatically transmit an electronic notification indicating the same to one or more of the remote devices 42. The controller 32 may be configured to continue to activate and/or apply the safety device unless and until authenticated override commands or authorizations are received from at least two, or any predetermined number of, approved parties 48, 44. In exemplary embodiments, without limitation, this may include receiving authentication information that is verified at the databases 36 and/or indication of successful authentication received from the remote devices 42 and/or an override command or authorization.

The parties 48, 44, may include at least one representative of a railroad owner and/or operator and/or at least one representative of a geographically proximate, applicable third-party authority, though such is not required. Alternatively, or additionally, without limitation, the representative of the railroad owner and/or operator need not necessarily be remote or received from a device 42 which is physically remote from the train 12. For example, without limitation, the train 12 engineer, conductor, operator, or the like may be approved to provide one of the multiparty authenticated overrides. Such authenticated override commands may be received at the controller 32, such as from one or more operator interfaces of one or more of the locomotives 14 of the train 12 or a remote device 42 located at the train 12 (but physically separate, and thus remote from, the controller 32, 34 in exemplary embodiments, without limitation). Any number or type of parties may provide the override authorizations. The geographically proximate, applicable third-party (e.g., governmental) authority 44 may be one or more governmental authorities, such as law enforcement, executive offices, regulatory agencies, combinations thereof, or the like. Where no such multi-party override is received, the controller 32 may be configured to continue to operate the safety devices, such as so the train 12 and/or locomotives 14 can no longer move under its own power. The controller 32 may be configured to only deactivate the safety devices where the multi-party override is received.

Figure 5:
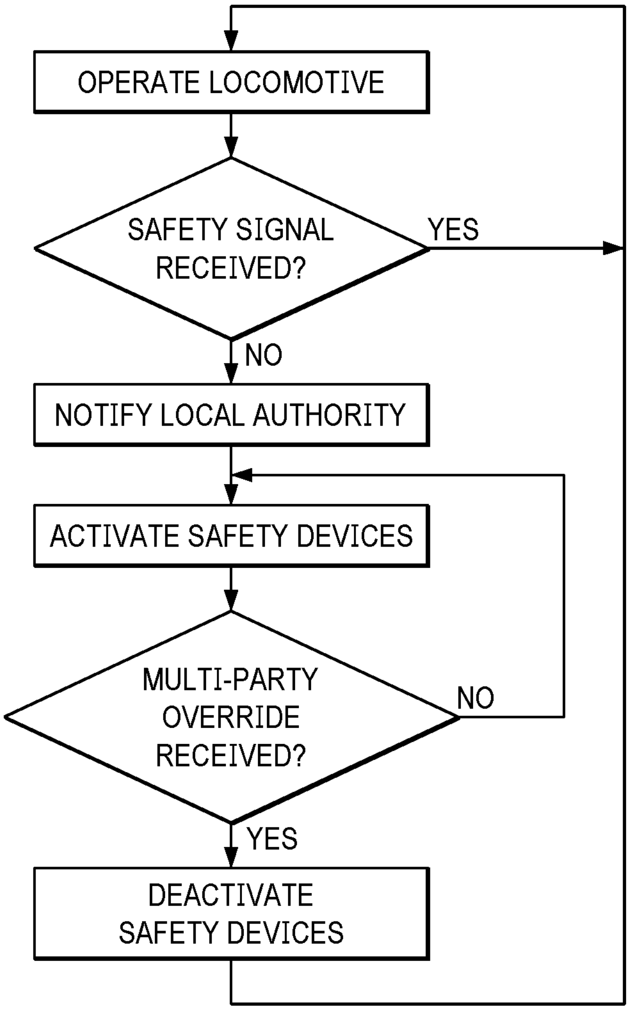
FIG. 5 is a flow chart with other exemplary logic for operating the system of FIGS. 1-3 in accordance with the present invention.

FIG. 5 illustrates another exemplary method for operating the system 10. The controller 32 may, alternatively or additionally, be configured to operate a safety subroutine whereby normal operations of the locomotive(s) 14 are only permitted so long as a safety signal is consistently received from one or more remote devices 42, such as associated with the interested party 48, the proximate third-party authority 44, and/or at least two or any predetermined number of the approved parties 44, 48. The safety signal may be provided in the form of an authenticated signal, encrypted key, password, presentation of an authentication device, combinations thereof, or the like. Where the safety signal is not received, the controller 32 may be configured to automatically activate one or more of the safety devices. The controller 32 may be configured to only deactivate the safety devices where the multi-party override is received. Successful receipt of the safety signal may be required by the controller 32 on a periodic basis, such as every 1 minute, 10 minutes, 1 hour, 2 days, combinations thereof, or the like. Any time period may be utilized.

Figure 6:
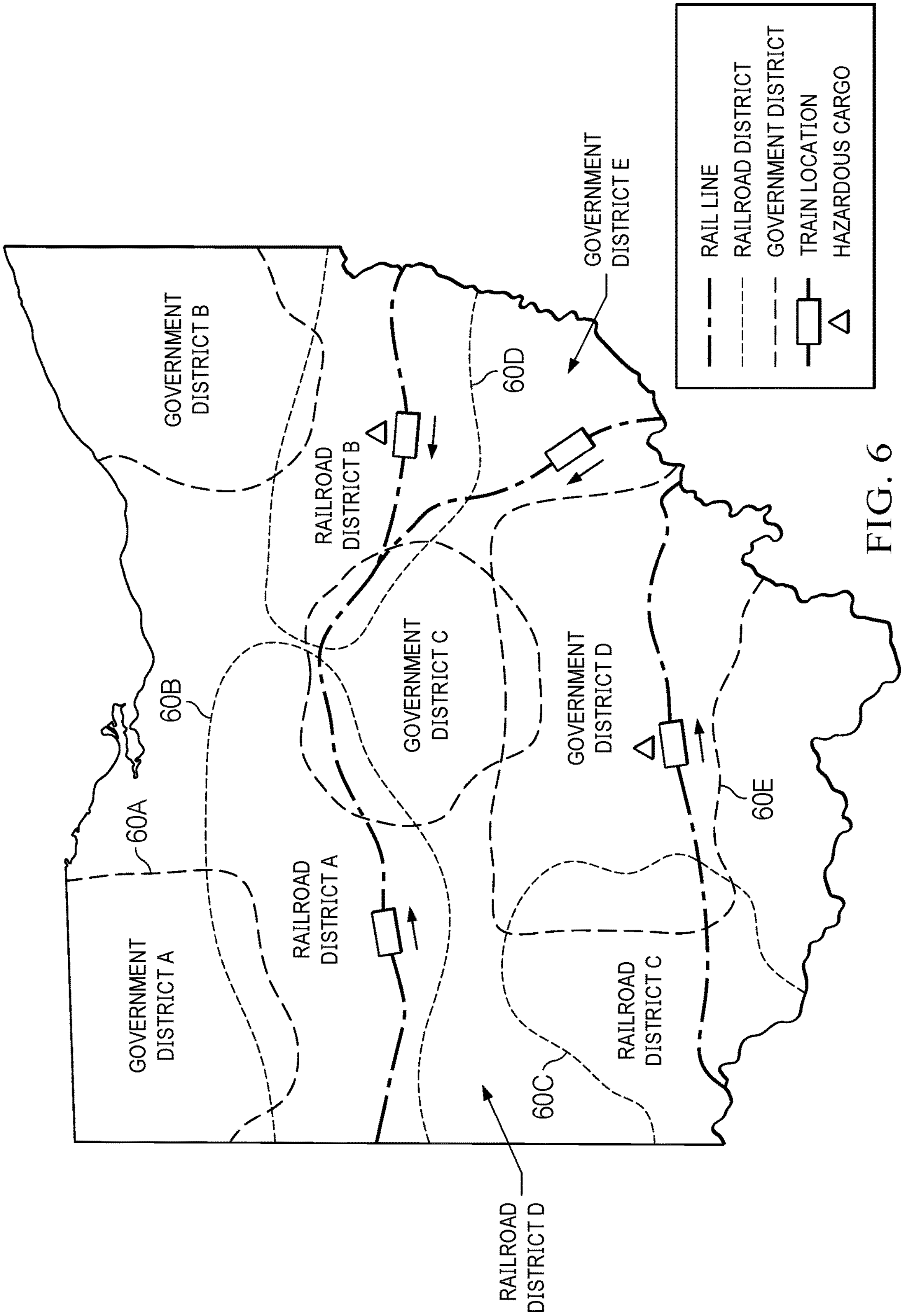
FIG. 6 is a plan view of an exemplary jurisdictional map for use with the systems and methods of FIGS. 1-5.

FIG. 6 illustrates an exemplary jurisdictional map for the system 10. In exemplary embodiments, the controller 32 may be configured to track or determine a location of the train 12 and/or cars 16 or locomotives 14 thereof. The controller 32 may be configured to additionally determine a direction and/or speeds of travel for the train 12, cars 16, and/or locomotives 14 thereof, such as to determine if an authority 44, 48 in advance of the train's 12 travel should be notified. Such information may be derived from data received from the location tracing device 40, propulsion system 50, and/or transponders 54 by way of non-limiting example. The display may alternatively or additionally include cargo information, such as stored at the database(s) 36, transponders 54, or the like. The cargo information may include a symbol for trains 12 and/or cars 16 carry cargo classified as hazardous, oversized, particularly large or heavy, combinations thereof, or the like. Detailed information may be provided, such as upon user selection of trains 12 and/or cars 16 at the display, including cargo, speed, direction of travel information, combinations thereof, or the like for each train 12 and/or car 16.

In exemplary embodiments, without limitation, the controller 32 may be configured to automatically alert the applicable jurisdictional authority 44, 48 as well as the next jurisdictional authority or authorities 44, 48 along the train's 12 anticipated travel path. For example, without limitation, the controller 32 may be configured to automatically alert a next jurisdictional authority 44, 48 along the train's 12 anticipated travel path where the train's 12 location is reported as within a predetermined distance of a local jurisdictional boundary and the train 12 is reported as advancing out of the local jurisdictional boundary, such as at a speed above a given threshold, such as opposed to further within the local jurisdictional boundary and/or slow enough that the next authority 44, 48 need not be informed at the given time.

For example, without limitation, the controller 32 may be configured to determine an approximate stopping distance for the train 12, such as based on the trains 12 current speed, rate of slow, one or more predetermined factors (e.g., assumed rate of slow, assumed stopping distance, combinations thereof, or the like) and may be configured to report to the remote devices 42 associated with all jurisdictional districts within a predetermined distance of the train's 12 current location and/or presumed stopping location following activation of the safety devices, for example.

The predetermined distances may be determined or varied based on the train's 12 and/or car's 16 reported cargo and/or weather conditions local to the train 12 and/or car 16, in exemplary embodiments without limitation. For example, without limitation, if the controller 32 determines that the train 12 and/or cars 16 are reported as carrying relatively non-hazardous cargo, the predetermined distance may be smaller as the main concern may be the physical impact of the cargo with surrounding objects. As another example, without limitation if the controller 32 determines that the train 12 and/or cars 16 are reported as carrying relatively hazardous cargo such as toxic chemicals, flammable material, or the like, the predetermined distance may be larger as concerns may include larger environmental impacts, fire, airborne toxins, or the like. The controller 32 may be configured to make such determinations based on criteria stored at the controller 32, such as at the database(s) 36. An example of criteria in this regard is provided at table 1 below without limitation. Any type or kind of criteria may be utilized with any amount of distance. The controller 32 may be configured to utilize the highest level of predetermined distance.

TABLE 1

| Cargo type | Predetermined distance |
|---|---|
| Non-flammable, non-toxic, normal size and weight | X miles |
| Flammable, non-toxic | Y miles |
| Toxic, non-flammable | Z miles |
| Toxic, flammable | A mile |
| Heavy | B miles |
| Oversized | C miles |

Alternatively, or additionally, the controller 32 may be configured to determine or vary the predetermined distance based on local weather conditions, such as but not limited to, prevailing winds, precipitation, ambient temperatures, or the like. For example, the predetermined distance may be varied and/or skewed in a particular direction based on windspeed and/or direction such that the predetermined distance is larger with higher windspeeds, or at least larger in a direction of the prevailing winds. As another example, without limitation, the presence of rain might decrease the predetermined distance for certain cargos (e.g., decreased risk of fire or airborne spread), or may increase the predetermined distance with other cargos (e.g., increased risk of carry into waterways).

The controller 32 may be configured to make such determinations based on criteria stored at the controller 32, such as at the database(s) 36. An example of criteria in this regard is provided at table 2 below without limitation. Any type or kind of criteria may be utilized with any amount of distance. The controller 32 may be configured to utilize the highest level of predetermined distance.

TABLE 2

| Weather conditions | Predetermined distance |
|---|---|
| Wind speed over A mph | X miles |
| Precipitation present | Y miles |
| Temperatures above B°F | Z miles |

The information of tables 1 and 2 is merely exemplary and not intended to be limiting. Any types or kinds of criteria and/or related distances may be utilized. The controller 32, in exemplary embodiments without limitation, may be configured to determine and/or vary the predetermined distance based on all relevant factors for a particular car 16 and/or train 12 and utilize the largest of the predetermined distances for notifications.

Where the electronic notifications are transmitted or the multi-party override is received, the controller 32 may be configured to automatically transmit such notification and/or requests for override to the application local third-party authority 44 and/or interested authority 48 representative, which may have the same or different jurisdictional coverage. Similarly, the controller 32 may be configured to seek consistent input of the safety signal for the applicable local third-party authority 44 and/or interested party 48 representative based on the location of the train 12. FIG. 6 is illustrated with particular regard to the state of Ohio to illustrate various exemplary jurisdictional districts 60A, 60B, 60C, etc. thereof for the parties 44, 48, by way of non-limiting example. Any number, size, and/or shape of jurisdictional districts 60 covering any number, size, and/or shape geographic areas for any number or type of parties may be utilized. Where no particular territory area is covered, in exemplary embodiments without limitation, a nearest district 60 may be located and/or a default authority may be assigned or utilized. The illustrated railroad routes are merely exemplary and not intended to be limiting. Where overlap is provided, the controller 32 may be configured to accept an authenticated override command from just one of the overlapping parties or may be configured require the authenticated override command from both. Any size, shape, number, and/or type of districts 60 may be utilized. Each district 60, default authority, or the like may be associated with a respective remote device 42, and/or remote devices 42 may be shared.

One or more graphical displays or interfaces with the information of FIG. 6 or similar variations thereof, may be displayed by the controller 32 at the remote devices 42, such as upon user request. The controller 32 may be configured to record and display additional information, such as but not limited to, direction of train 12 travel, identifying information for the train 12, cargo information for the train 12, owner and/or operation information for personnel assigned to the train 12, combinations thereof, or the like. Some or all of such information may be stored and/or retrieved from the database 36 though such is not required.

Certain operations described herein may be performed by one or more electronic devices. Each electronic device may comprise one or more processors, electronic storage devices, executable software instructions, combinations thereof, and the like configured to perform the operations described herein. The electronic devices may be general purpose computers or specialized computing devices. The electronic devices may comprise personal computers, smartphone, tablets, databases, servers, or the like. The electronic connections and transmissions described herein may be accomplished by wired or wireless means. The computerized hardware, software, components, systems, steps, methods, and/or processes described herein may serve to improve the speed of the computerized hardware, software, systems, steps, methods, and/or processes described herein. The electronic devices, including but not necessarily limited to the electronic storage devices, databases, controllers, or the like, may comprise and/or be configured to hold, solely non-transitory signals.

What is claimed is:

1. A safety system for a freight car of a train, the system comprising:

a first sensor located proximate to an axle of the freight car;

a second sensor located proximate to a bearing for the axle;

one or more safety devices located at the train, which when activated are configured to slow or stop the train or the freight car;

a first set of one or more remote devices, each associated with a railroad operations authority;

a second set of one or more remote devices, each associated with a local governmental authority; and a control system in electronic communication with the sensors and the one or more safety devices, said control system comprising one or more electronic storage devices comprising predetermined safety parameters and software instructions, which when executed, configure one or more processors of the control system to:

receive data from the sensors;

determine if the data exceeds any of the safety parameters;

if a determination is made that the data exceeds any of the safety parameters:

automatically activate the one or more safety devices, and generate and transmit an electronic notification indicating activation of the one or more safety devices to at least one of the first set of one or more remote devices and at least one of the second set of one or more remote devices; and prevent deactivation of the one or more safety devices unless and until an authenticated override authorization is received from both of: the at least one of the first set of one or more remote devices and the at least one of the second set of one or more remote devices; and following receipt of the authenticated override authorizations, command deactivation of the one or more safety devices.

2. The system of claim 1 wherein:

the one or more safety devices comprise an automated braking subsystem for a brake system of the freight car.

3. The system of claim 2 further comprising:

a power supply located at the freight car in electrical connection with the sensors, the control system, and the one or more safety devices, the power supply comprising at least one battery and at least one of: a solar panel and a wind turbine, wherein the control system is located exclusively at the freight car.

4. The system of claim 3 wherein:

the one or more safety devices comprise a decoupling device configured to automatically decouple the freight car from a remainder of the train.

5. The system of claim 1 wherein:

the one or more safety devices comprise a subroutine stored at the one or more electronic storage devices, which when executed, configures the one or more processors to reduce an operational power level of a propulsion system of an engine for the train.

6. The system of claim 1 wherein:

the one or more safety devices comprise a subroutine stored at the one or more electronic storage devices, which when executed, configures the one or more processors to electronically prevent certain user input at operator interfaces for a locomotive of the train from full or normal processing.

7. The system of claim 1 wherein:

the sensors comprise temperature sensors; and the safety parameters comprise temperature thresholds.

8. The system of claim 1 wherein:

the sensors comprise frequency sensors; and the safety parameters comprise frequency thresholds or ranges.

9. The system of claim 1 wherein:

the one or more electronic storage devices comprise authentication information entries and additional software instructions, which when executed, configure the one or more processors to receive user input comprising authentication information and determine if the received authentication information matches any of the authentication information entries.

10. The system of claim 9 wherein:

the authentication information comprises biometric information;

the authenticated override authorization comprises an encrypted code;

the authentication information entries comprise authorized codes; and the one or more electronic storage devices comprise additional software instructions, which when executed, configure the one or more processors to:

decrypt the encrypted code;

compare the decrypted code to the authorized codes to determine a match; and determine that each of the authenticated override authorizations are received when both the received authentication information matches any of the authentication information entries and the decrypted code matches one of the authorized codes for a given user input from a given one of the remote devices.

11. The system of claim 1 further comprising:

a network communication device facilitating wireless network internet-based communication between the control system and each of the first set of one or more remote devices and the second set of one or more remote devices, wherein each of the first set of one or more remote devices, each of the second set of one or more remote devices, and the control system comprises a dedicated appliance, and wherein the control system is in electronic communication with each of the first set of one or more remote devices and each of the second set of one or more remote devices within a closed network by way of the dedicated appliance.

12. The system of claim 1 further comprising:

a network communication device facilitating wireless network internet-based communication between the control system and each of the first set of one or more remote devices and the second set of one or more remote devices; and a near field communication device facilitating wireless, near-field communication between the control system and the first sensor, the second sensor, and each of the one or more safety devices.

13. The system of claim 1 further comprising:

a transponder located at the freight car comprising electronically stored cargo information for the freight car and a location detection device, the transponder configured to automatically and wirelessly transmit a signal to the at least one of the first set of one or more remote devices and the at least one of the second set of one or more remote devices comprising the cargo information and a current location determined by the location detection device.

14. The system of claim 1 wherein:

the one or more electronic storage devices comprise additional software instructions, which when executed, configure the one or more processors to:

monitor for a periodic safety signal from at least one of the first set of one or more remote devices and at least one of the second set of one or more remote devices;

when the safety signal is not periodically received from at least one of the first set of one or more remote devices and at least one of the second set of one or more remote devices, automatically activate the one or more safety devices, generate and transmit an electronic notification indicating activation of the one or more safety devices to the at the least one of the first set of one or more remote devices and the at least one of the second set of one or more remote devices, and prevent deactivation of the one or more safety devices unless and until the authenticated override authorization is received from at least both of: the at least one of the first set of one or more remote devices and the at least one of the second set of one or more remote devices, and following receipt of the authenticated override authorizations from the at least one of the first set of one or more remote devices and the at least one of the second set of one or more remote devices, command deactivation of the one or more safety devices.

15. The system of claim 1 wherein:

the control system comprises a dedicated control subsystem for the freight car and a master control unit located at a locomotive for the train.

16. The system of claim 1 wherein:

the first set of one or more remote devices comprises multiple remote devices, each associated with a respective railroad operations authority district;

the second set of one or more remote devices comprises multiple remote devices, each associated with a local governmental authority district;

the control system comprises a location tracking device, where the one or more electronic storage devices comprise additional software instructions, which when executed, configure the one or more processors to:

determine a location for the train;

determine which of the railroad operations authority districts the train is located in; and determine which of the local governmental authority districts the train is located in;

the at least one of the first set of one or more remote devices is associated with the railroad operations authority district the train is located in; and the at least one of the second set of one or more remote devices is associated with the local governmental authority district the train is located in.

17. The system of claim 1 further comprising:

wired connections extending between the first sensor, the second sensor, the one or more safety devices, and the control system by way of at least a coupling between the freight car and a locomotive of the train, wherein the control system is located exclusively at the locomotive.

18. A safety system for a train having a locomotive and a plurality of freight cars, the system comprising:

sensors comprising temperature and frequency sensors located proximate to axles and bearing subassemblies for railway track wheels of the train, wherein at least one of the sensors is located at each of the freight cars of the train;

automated braking devices located at braking systems for the railway track wheels of the train, wherein at least one of the automated braking devices is located at each of the freight cars of the train;

a first set of remote devices, each associated with a respective railroad operations authority and a respective railroad operations authority district;

a second set of remote devices, each associated with a respective local governmental authority and a respective local governmental authority district;

a control system comprising a master control unit located at the locomotive and a dedicated control subsystem located at each of the freight cars of the trains, wherein each of the sensors and each of the automated braking devices for a respective one of the freight cars of the train is in electronic communication with a respective one of the dedicated control subsystems for the respective one of the freight cars of the train, and each of the dedicated control subsystems is in electronic communication with the master control unit;

wherein the master control unit is in wireless electronic communication with each of the first set of remote devices and each of the second set of remote devices;

wherein the master control unit comprises one or more electronic storage devices comprising cargo information for the train, predetermined safety parameters comprising temperature thresholds and frequency ranges or thresholds, and software instructions, which when executed, configure one or more processors of the control system to:

receive data from the sensors;

determine if the data is outside of any of the safety parameters; and if a determination is made that the data is outside of any of the safety parameters:

automatically activate the automated braking devices;

issue an electronic command to a propulsion system for the locomotive configured to cause the propulsion system to operate the locomotive at reduced speeds;

determine a location for the train;

determine which of the railroad operations authority districts the train is located in;

determine which of the local governmental authority districts the train is located in;

generate and transmit an electronic safety alert to a respective one of the first set of remote devices associated with the railroad operations authority district the train is located in and a respective one of the second set of remote devices associated with the local governmental authority district the train is located in indicating the cargo information for the train, the location for the train and that the data is outside of the safety parameters;

electronically prevent deactivation of the automated braking devices and increase in power levels of the propulsion system unless and until an authenticated override authorization is received from both of: the respective one of the first set of remote devices and the respective one of the second set of remote devices; and following receipt of the authenticated override authorizations, command deactivation of the automated braking devices, and permit increase in power levels of the propulsion system;

wherein each of the first set of remote devices, each of the second set of remote devices, and the control system comprise a dedicated computing appliance which intercommunicate on a closed network.

19. The system of claim 18 wherein:

each of at least one coupling for the train comprises an electrically conductive surface configured to mate when coupled; and a wired connection between the dedicated control subsystem and the master control unit is established, at least in part, by way of the electrically conductive surfaces of the couplings.

20. A method for operating a safety system for a train having a locomotive and a plurality of freight cars, the method comprising:

receiving data from sensors located proximate axles and bearing sets of wheels for the train indicating temperature and frequency information;

electronically comparing, at a control system located onboard the train, the received data against electronically stored and predetermined safety parameters comprising temperature thresholds and frequency thresholds or ranges;

determining, at the control system, that at least one reading in the received data is outside at least one of the safety parameters;

electronically commanding, by way of the control system, activation of safety devices for the train comprising automated braking devices associated with the wheels for the train, activation of an electronic slowdown subroutine for a propulsion system for the locomotive, and activation of a selective electronic lockout subroutine for operator interfaces of the locomotive;

determining, by way of a location tracking device associated with the control system, a location for the train;

determining, by way of the control system, a respective one of railroad operations authority districts the train is located in and a respective one of local governmental authority districts the train is located in;

electronically generating and transmitting, by way of the control system, an electronic safety alert to a first remote device associated with the railroad operations authority district the train is located in and a second remote device associated with the local governmental authority district the train is located in indicating activation of the safety devices for the train;

electronically receiving, at the control system from both of the first remote device and the second remote device, override authorizations;

verifying the authenticity of the override authorizations by electronically comparing, at the control system, authentication information and override authorization code information with stored authentication information and override code information; and electronically commanding, by way of the control system, deactivation of the safety devices for the train.

* * * * *